(Model.)

N. J. & W. J. T. CURTIS.
Check Rower for Corn Planters.

No. 241,939. Patented May 24, 1881.

WITNESSES:

INVENTOR:
N. J. Curtis
W. J. T. Curtis

ATTORNEYS.

UNITED STATES PATENT OFFICE.

NIMROD J. CURTIS AND WILLIAM J. T. CURTIS, OF MARTELLE, IOWA.

CHECK-ROWER FOR CORN-PLANTERS.

SPECIFICATION forming part of Letters Patent No. 241,939, dated May 24, 1881.

Application filed March 12, 1881. (Model.)

*To all whom it may concern:*

Be it known that we, NIMROD J. CURTIS and WILLIAM J. T. CURTIS, of Martelle, in the county of Jones and State of Iowa, have invented a new and useful Improvement in Check-Rowers for Corn-Planters, of which the following is a full, clear, and exact description.

Our invention consists in a novel construction and combination, with the seed-dropping slide of a corn-planter, of a pair of rimless wheels, a shaft, a series of elastic arms, and a cam, whereby provision is made for dropping the corn at regular intervals, as hereinafter described.

Figure 1:
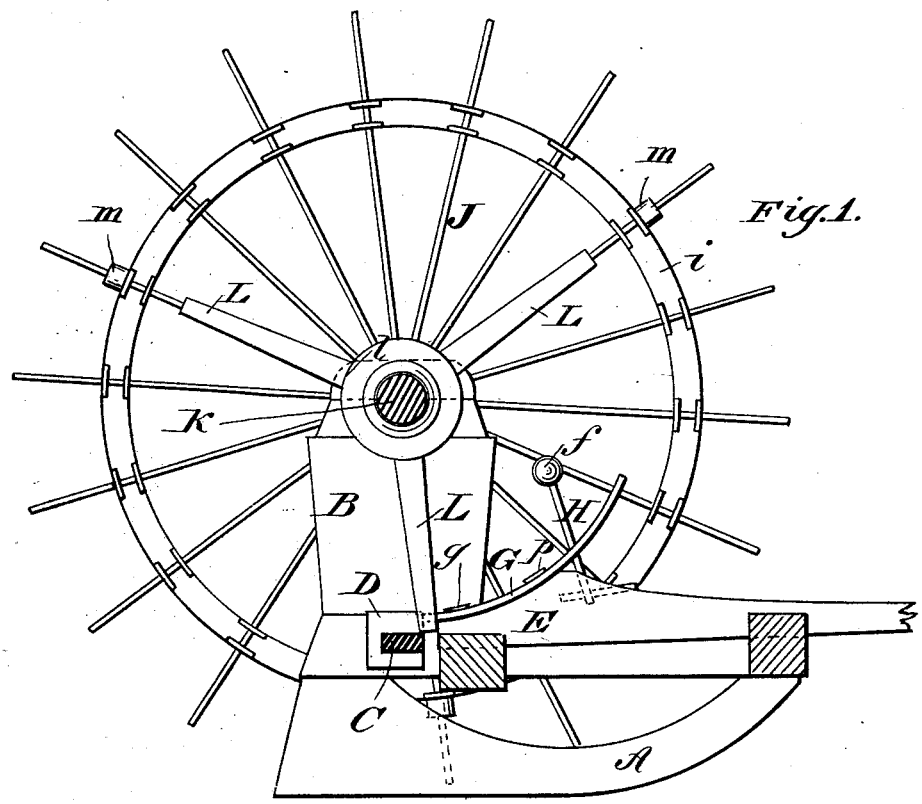
Figure 2:
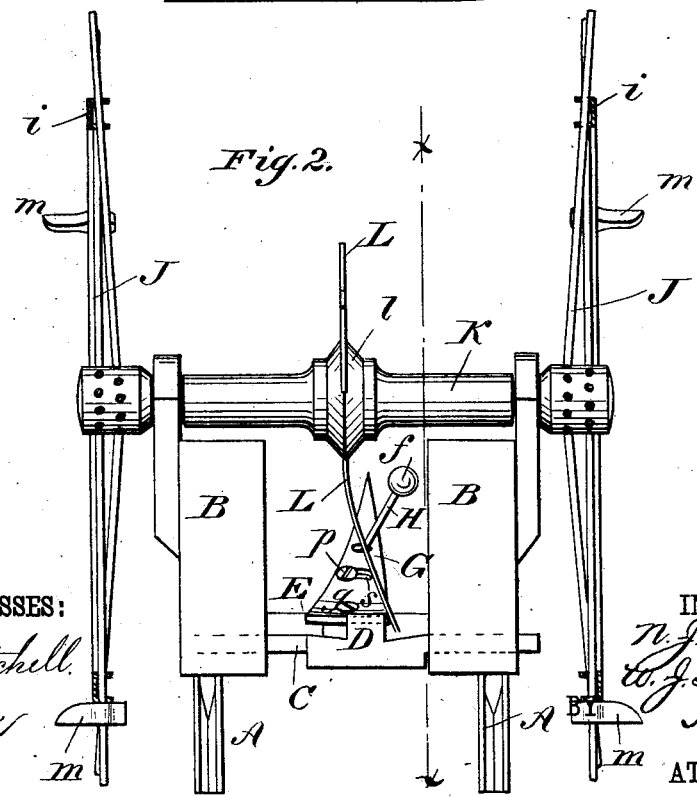

In the accompanying drawings, Figure 1 is a longitudinal vertical sectional view of a machine embodying our improvements. Fig. 2 is a rear view of the same.

Similar letters of reference indicate corresponding parts.

A represents the runners of a planter, of the usual or any suitable description, from the rear portions of which extend upward two standards, B B, to which the seed-boxes are attached.

In the lower portion of the standards B works a slide, C, in the center of which is an upwardly-extending lug, D.

Immediately in rear of the tongue of the machine is a bar, E, parallel with the runners A and midway between them, to which bar is pivoted a cam consisting of a triangular plate, G, curved upward and forward, as shown. The pivot $g$ is placed near the base of the triangle, and the apex extends in a forward direction.

Near the apex or front portion of the plate G is a transverse slot in which works a bar, H, having its lower end pivoted to the bar E, and carrying a weight, $f$, at its upper end.

At or near the top of the standards B is journaled a shaft, K, to the ends of which, outside of said standards, are attached wheels J, which are rimless—that is to say, the spokes of said wheels project beyond their supporting-ring $i$, instead of terminating in a band or tire. Midway of the length of said shaft is a hub, $l$, from which extend radial arms L, made of elastic metal or other suitable material. A number of the spokes of the wheel J corresponding with the number of arms L are provided with shoes $m$, which may be adjustable on said spokes, for marking where the seed is dropped.

As the machine is drawn along the ends of the spokes of the wheel J catch in the soil and cause the shaft K to revolve and the elastic radial arms L to engage with the triangular plate or cam G. The first arm engages with one side or edge of the plate, the next arm with the opposite side or edge, the next with the first side or edge, and so on. As each arm engages with the plate G the arm is bent outward until it passes the line of the pivot $g$, after which its force reverses the position of said plate and throws its point or apex toward the opposite side of the machine, so as to cause the next arm to engage with the opposite edge of the plate. The motion of the plate G is limited by a pin or screw, $p$, projecting from the bar E through a slot, $s$, in said plate, and it is assisted past the center by the bar H and weight $f$. When the arm L passes the line of the pivot $g$, and then slips beyond the rear angle or base of the plate G, it strikes one side of the lug D so as to move the seed-slide C in one direction. The next arm moves it in the opposite direction, and thus the slide is alternately moved in opposite directions by the revolution of the wheels J and the engagement of the arms with the lug D. As the machine moves along and the seed is dropped the markers $m$ mark the points and indicate where the cross-rows may be run.

We are aware that it is not new to operate a seed-slide by a rock-shaft arm, a disk, and tappets, or by a stud on shaft acted upon by tappets, or by a slide-bar, wedge-shaped projection on lever, and a wheel having spring-arms on each side.

Having thus described our invention, we claim as new and desire to secure by Letters Patent—

The combination of the wheel J, shaft K, elastic arms L, triangular slotted plate G, having pivot $g$, bar E, having pin $p$, bar H, carrying weight $f$, and seed-slide having central lug, D, substantially as shown and described.

NIMROD JASPER CURTIS.
WILLIAM JARVIS TOWNSAND CURTIS.

Witnesses:
P. PELTON,
G. W. METTEE.